United States Patent
Nakamura et al.

[15] 3,652,203
[45] Mar. 28, 1972

[54] SIMULTANEOUS PREPARATION OF CARBONYL SULFIDE AND AMMONIUM THIOCYANATE

[72] Inventors: Shizuo Nakamura, Tokyo; Masanobu Ito, Sagamihara, both of Japan

[73] Assignee: Sagami Chemical Research Center, Tokyo, Japan

[22] Filed: Sept. 29, 1970

[21] Appl. No.: 76,640

[52] U.S. Cl. .................................................23/75, 23/203 R
[51] Int. Cl. .......................................C01c 3/20, C01b 31/26
[58] Field of Search...................................23/75, 134, 203 R

[56] References Cited

OTHER PUBLICATIONS

Landenburg: Berichte, Vol. 1, (1868), pp. 273–274

Primary Examiner—Oscar R. Vertiz
Assistant Examiner—Hoke S. Miller
Attorney—Wenderoth, Lind & Ponack

[57] ABSTRACT

A process for the simultaneous preparation of carbonyl sulfide and ammonium thiocyanate, which comprises heating and reacting urea with carbon disulfide at liquid phase, in aliphatic monohydric alcohol of one to four carbon atoms serving as the reaction medium.

6 Claims, No Drawings

SIMULTANEOUS PREPARATION OF CARBONYL SULFIDE AND AMMONIUM THIOCYANATE

This invention relates to a process for the simultaneous preparation of carbonyl sulfide and ammonium thiocyanate. More particularly, the invention relates to a process for the simultaneous preparation of carbonyl sulfide and ammonium thiocyanate, by heating and reacting urea and carbon disulfide at liquid phase, in lower alcohol serving as the reaction medium.

Carbonyl sulfide has been collecting attention as a valuable starting material for making active ingredient of agricultural chemicals, particularly herbicides, and its economical production on industrial scale has been the demand of the trade. Ammonium thiocyanate also is a valuable substance, well known as the additives of synthetic resin, stabilizer of hydrogen peroxide, photographic chemicals, fertilizers, herbicides, and the starting material to prepare thiourea.

The main reaction intended in the invention can be expressed by the formula below:

$$NH_2\text{—}CO\text{—}NH_2 + CS_2 \rightarrow COS + NH_4SCN \quad (I)$$

Concerning the reaction between urea and carbon disulfide, studies of A. Ladenburg Ber., 1,273(1868) is known of old. He reported that, when the named two substances were together heated in a sealed tube at 110° C. for several hours, formation of carbonyl sulfide was observed. However, his report is entirely silent on the yield. Ladenburg also surmised the reaction mechanism to be corresponding to the reaction formula (I) given above, but as to the ammonium thiocyanate he only wrote the chemical formula of CSNH·NH$_3$ in the reaction formula, never elaborating on its identification or quantitative relation.

According to our reproductive experiments, no reaction takes place under 2 hours' heating at 110° C., as demonstrated also in the later given Control. We observed the state of the system in sealed glass tube in the above experiment, and confirmed that the urea crystals were present in the liquid carbon disulfide undissolved, showing no color change. The urea was molten to form liquid phase at 140° C., but the reaction rate was extremely low. At 150° C., only in the presence of excessive carbon disulfide, appreciable progress of the reaction was observed, and the liquid was colored yellow. However, the quantity of carbonyl sulfide in the formed gas was only minor, and considerable quantity of carbon dioxide was present as mixed therewith.

No report on the above reaction is available after the above Ladenburg's study, and the reaction has never received industrial concern.

It has now been found that when urea and carbon disulfide are heated and reacted in anhydrous, aliphatic lower monohydric alcohol serving as the reaction medium, carbonyl sulfide is formed at a high reaction rate, with the yield as high as approximately 95%, and that simultaneously therewith, ammonium thiocyanate is formed at similarly high yield.

Accordingly, the main object of the invention is to provide a process for making carbonyl sulfide and ammonium thiocyanate from urea and carbon disulfide with industrial advantage.

The fact that the reaction of formula (I) is effectively promoted in the presence of lower alcohol is indeed surprising, when the following circumstances are considered.

First of all, it is anticipated that the two reactants could not produce the object compounds at high yield, because the alcohol itself would react with these reactants. It is well known that alcohol reacts with carbon disulfide, particularly in the presence of minor amount of alkali, to produce the corresponding mercaptan, and also that alcohol reacts with urea to produce alkyl carbamate and biuret (Refer, for example, to U.S. Pat. No. 2,871,259). In view of such known facts, it is only logical to expect that the presence of alcohol will rather interfere with the main reaction intended by the subject invention. Therefore, it is entirely unpredictable that the reaction of formula (I) predominantly takes place as in the subject invention. We discovered this fact which is quite contrary to the seemingly logical presumption. This is probably because the concurrent presence of the two starting materials, urea and carbon disulfide, and the formed ammonium thiocyanate inhibit the above-described undesirable reactions of each reactant with alcohol.

Secondly, when organic solvents other than the lower alcohols are used as the reaction media, for example, acetone or dimethylsulfoxide, in the similar reaction, decomposition takes place to cause coloring and precipitation of side product. Also if ethers such as ethyl ether, dioxane, or polyhydric alcohols such as glycol, glycerol, etc. are used, the reaction is not effectively accelerated, and in all cases the recovery of object products at high yields are never achieved. Therefore, the newly discovered fact, that the lower alcohols only do effectively promote the reaction of formula (I), is entirely unpredictable. Thus, the advantageous result achieved by the presence of lower alcohols is not only that caused by homogenization of the reaction system by the solvent, but also presumably that caused by the activity characteristic to such alcohols only.

Hereinafter the invention will be more fully explained.

The subject process for the simultaneous preparation of carbonyl sulfide and ammonium thiocyanate comprises heating and reacting urea with carbon disulfide at liquid phase, in an aliphatic, monohydric alcohol of one to four carbon atoms serving as the reaction medium.

The lower alcohols useful as the reaction medium include methanol, ethanol, propanol and butanol. Among the named alcohols, methanol exhibits high solubility of urea, one of the starting materials, and consequently use of only minor amount thereof is sufficient for the purpose, allowing to maintain high concentration of the starting materials in the reaction system. As the result, the rate of the main reaction can be increased, and the side reaction between urea and alcohol can be inhibited to the minimum. Furthermore, methanol has also high solubility of the formed ammonium thiocyanate, facilitating the operations. Thus methanol is the most preferred reaction medium. Whereas, ethanol has been dissolving ability of urea compared with methanol, but has the advantage of higher solubility of carbon disulfide.

It is desirable that the quantity of lower alcohol should be at least sufficient to maintain the reaction system at homogeneous phase at the reaction temperature. If it is less, the reaction system tends to become heterogeneous, and the reaction rate is reduced. Whereas, if it is excessively great, the reaction rate is reduced and side reactions are increased. The optinum quantity of the lower alcohol can easily be determined by simple preliminary test, according to the type of the alcohol and reaction temperature employed. Generally speaking, the quantity is within the range of approximately equal to twice the total sum of the starting materials. Use of greater quantity is not impossible, but it is recommended that the alcohol should never exceed approximately seven times the sum quantity of the starting materials. It should be put into consideration that, the alcohol of a quantity insufficient to keep the reaction system at homogeneous phase at room temperature might form homogeneous phase upon temperature rise to the level suitable for the reaction.

The reaction temperature is suitably selected within the range of 100°–190° C., preferably 120°–160° C. Under such temperatures, the reaction is performed in an air-tightly closed vessel, under autogenous pressure. At low reaction temperatures, obviously the reaction rate is low. Whereas, high temperatures exceeding 190° C. are also disadvantageous, because side reactions are increased and the autogenous pressure becomes objectionably great. The autogenous pressure reaches in most cases 30– 70 kg./cm.², when methanol is used at the reaction temperatures ranging from 120° to 160° C. The reaction time may range from 10 minutes to 5 hours. The reaction rate is generally high, with minor difference depending on the temperature. At 160°–120° C., the maximum yield of the object product is reached within approximately 20 minutes to 5 hours, but the yield of ammonium thiocyanate is somewhat reduced as the reaction progresses, since the product is partially isomerized to thiourea, or cause secondary reaction with carbon disulfide.

Under the conditions given in the later-appearing Examples, in most cases the secondary change of ammonium thiocyanate takes place. In order to obtain ammonium thiocyanate at yields higher than those achieved in the Examples, the reaction time may be shortened. Under suitably selected conditions, yields higher than 90% can easily be accomplished.

The quantitative ratios of the two starting materials are not critical. Normally the ratio of 1:1 (molar ratio) in accordance with the formula (I) and those in the vicinity of equimolar point, i.e., 1:1.2 to 1.2:1 in molar ratio are applied with preference. Ratios outside the specified range are not impermissible, but those outside the range of 1:4 to 4:1 in mol ratio should be avoided. Normally when greater quantity of carbonyl sulfide is wanted, excessive quantity of carbon disulfide is used, and if greater yield of ammonium thiocyanate is desired, urea is used in excess.

The gaseous phase of the reaction product contains the formed carbonyl sulfide as the chief component, as well as vapors of unreacted carbon disulfide and the alcohol employed as the medium, with very minor quantities of side-produced hydrogen sulfide, carbon dioxide, etc. The liquid phase comprises the formed ammonium thiocyanate as dissolved in the alcohol used as the medium. Each of the object product can be isolated through suitable separation and purification as desired.

As so far explained, this invention is very unique in that valuable carbonyl sulfide and ammonium thiocyanate are formed from urea and carbon disulfide with high efficiency and ease. From the standpoint of industrial production, the subject invention further has the following advantages.

It is known that carbonyl sulfide can be obtained by direct reaction of carbon monoxide with sulfur at 400°–500° C. However, that process is apt to encounter difficult problems in industrial scale production, concerning the starting materials. That is, from economical reasons, carbon monoxide-generating apparatus must be of considerably large scale. Consequently, the carbonyl sulfide production must also be practiced on large scale to secure any profit. If carbon monoxide supply is sought from outer source, the expenses necessary for its handling, transfer, storage, etc. will incur innegligible influence on the cost price of the product, because carbon monoxide is a permanent gas. In contrast thereto, the process and equipments of the invention are very simple, and carbonyl sulfide can be produced inexpensively and efficiently to suit the demand, with medium or smaller scale installations. Furthermore, both starting materials are easily available, and are solid or liquid at normal temperature, allowing easy transportation. During the operation, solid urea can be handled as liquid as dissolved in alcohol, advantageously simplyfying reaction equipments and operations.

Hereinafter the invention will be further explained with reference to Examples and Controls. The product gas was analyzed by means of gas chromatoragpghy and volumetric analysis by titration of gas-absorbent liquid.

Concerning the liquid phase, ammonium thiocyanate was identified by infrared spectrum and quantitatively it was analyzed by silver nitrate titration, and as for urea, the ammonia generated by the decomposition of it with ureas was measured to estimate its quantity.

Five (5) g. of urea and 20 g. of carbon disulfide were charged in a pressure glass vessel without reaction medium, and heated to various temperatures as 110° C., 140° C., and 150° C., with stirring. Formed products were analyzed with the results as given in Table 1.

| Temp. (°C.) | Reaction Time (min.) | Condition of Reaction Phase | Yield of COS (%) | Detection SCN* |
|---|---|---|---|---|
| 110 | 120 | Solid and liquid phases | 0 | — |
| 140 | 85 | Two liquid phases | 0.06 | + |
| 150 | 120 | Tow liquid phases | 1.6 | + |

*The detection of thiocyanate ion was performed by $Fe^{+++}$

EXAMPLE 1

Urea and carbon disulfide of the quantities each indicated in Table below were added to various reaction media such as methanol, ethanol, propanol (Those three runs are within the scope of this invention), ethylene glycol, glycerol, acetone, dimethylsulfoxide (DMSO), and dioxane (as Controls), and reacted at 130°–160° C. in a pressure glass vessel. The results of analyzing the reaction products are given in Table 2.

TABLE 2

| Starting materials | | | | | Product's yield (based on urea) | |
|---|---|---|---|---|---|---|
| Urea, g. | Carbon disulfide, g. | Reaction medium, g. | Temp., °C. | Time, min. | Carbonyl sulfide, percent | Ammonium thiocyanate, percent |
| 2.0 | 3.0 | Methanol, 5 | 150 | 120 | 90 | 88 |
| 2.0 | 3.0 | Ethanol, 5 | 150 | 120 | 87 | 76 |
| 2.0 | 3.0 | Isopropanol, 10 | 160 | 120 | 71 | 59 |
| 6.8 | 7.8 | Ethylene glycol, 25 | 152 | 180 | 25 | 21 |
| 6.8 | 7.8 | Glycerol, 25 | 152 | 180 | 20 | 17 |
| 5.3 | 6.6 | Acetone, 24 | 153 | 30 | 8 | (1) |
| 1.0 | 1.5 | DMSO, 5 | 130 | 60 | (2) | (3) |
| 3.5 | 4.5 | Dioxane, 20 | 152 | 70 | 34 | 21 |

1 Changed to reddish brown or black.
2 Trace.
3 Sulfur was precipitated.

EXAMPLE 2

Five g. of urea and 5 ml. of carbon disulfide were added to 7–12 ml. of methanol, and charged in a stainless steel reactor, to be reacted at 136°–139° C. for 3 hours under stirring. The analysis results of the reaction products are shown in Table 3.

TABLE 3

| Starting materials | | | Product's yield percent | | | |
|---|---|---|---|---|---|---|
| Urea, g. | Carbon disulfide, ml. | Solvent, methanol, ml. | $NH_4SCN$ | COS | $H_2S$ | $CO_2$ |
| 4.99 | 5 | 7.0 | 69.5 | 95 | 3 | 1.9 |
| 5.01 | 5 | 8.0 | 71.0 | 91 | 2.4 | 1.2 |
| 4.97 | 5 | 9.0 | 70.5 | 85 | 2.5 | 1.4 |
| 4.98 | 5 | 10.0 | 66.5 | 87 | 2.5 | 1.1 |
| 4.93 | 5 | 11.0 | 68.5 | 83.5 | 3 | 1.7 |
| 4.96 | 5 | 12.0 | 67.0 | 85.5 | 3.2 | 1.8 |

Incidentally, the crude ammonium thiocyanate contained trace of methyl carbamate ($NH_2COOCH_2$) as impurities.

EXAMPLE 3

Urea and carbon disulfide were added to methanol, charged in a stainless steel reactor, and reacted at 120°–190° C. for 1–3 hours under stirring. As to the seven runs, the respective temperature, reaction time, quantities of starting materials, and analysis results of the products are shown in Table 4 below.

| Time (min.) | Conversion to Ammonium Thiocyanate (%) | | |
|---|---|---|---|
| | 130° C. | 140° C. | 150° C. |
| 10 | 15 | 39 | 62 |
| 20 | 30 | 57 | 73 |
| 30 | 40 | 65 | 78 |
| 40 | 49 | 71 | 80 |
| 60 | — | 80 | — |
| 70 | — | — | 84 |
| 80 | 68 | 86 | — |
| 90 | — | — | 82 |
| 100 | 75 | 90 | — |
| 130 | — | 89 | — |
| 160 | 83 | 87 | 75 |

TABLE 4

| Temp., ° C.: | Time, hr. | Mol ratio $CO(NH_2)_2/CS_2$ | Starting materials, in grams | | | Products in grams | | | | | | | Yield, percent | |
|---|---|---|---|---|---|---|---|---|---|---|---|---|---|---|
| | | | $CO(NH_2)_2$ | $CS_2$ | $CH_3OH$ | COS | $CS_2$ | $CO_2$ | $H_2S$ | (1) | (2) | (3) | Carbonyl sulfide | Ammonium thiocyanate |
| 120 | 3 | 1/1 | 5.00 | 6.34 | 8.0 | 2.10 | 3.63 | 0.0 | 0.05 | 2.71 | 2.90 | 0.0 | 42.0 | 42.5 |
| 130 | 2 | 1/1 | 5.00 | 6.34 | 8.0 | 2.62 | 2.85 | 0.012 | 0.05 | 2.95 | 2.13 | 0.0 | 52.4 | 46.5 |
| 140 | 3 | 1/1 | 5.00 | 6.34 | 8.0 | 4.27 | 0.62 | 0.16 | 0.095 | 4.72 | 0.34 | 0.22 | 85.4 | 74.2 |
| 175 | 2 | 1/1 | 5.00 | 6.34 | 8.0 | 1.86 | 1.62 | 0.66 | 0.44 | 2.55 | 0.07 | 0.90 | 37.2 | 40.2 |
| 190 | 1 | 1/1 | 5.00 | 6.34 | 8.0 | 0.54 | 1.71 | 1.14 | 1.03 | 0.88 | 0.0 | 2.01 | 10.8 | 14.9 |
| 140 | 3 | 1.5/1 | 7.5 | 6.34 | 8.0 | 4.61 | 0.15 | 0.018 | 0.042 | 5.51 | 3.20 | 0.24 | [4] 92.2 | [4] 87.0 |
| 140 | 3 | 1/1.9 | 5.00 | 12.00 | 8.0 | 4.71 | 5.78 | 0.016 | 0.15 | 4.84 | 0.04 | 0.23 | [5] 94.2 | [5] 76.2 |

[1] $NH_4SCN$.
[2] $CO(NH_2)_2$.
[3] $CS(NH_2)_2$.
[4] Based on $CS_2$.
[5] Based on urea.

EXAMPLE 4

Twenty-five g. of urea and 31.7 g. of carbon disulfide (mol ratio = 1:1) were added into 40.0 g. of methanol, and reacted in a stainless steel autoclave of 104 ml. in capacity, at each 130° C., 140° C., and 150° C. With the progress of the reaction, 1 to 2 ml. of the reaction mixture was successively withdrawn from the system. The conversions thus calculated (production ratio of ammonium thiocyanate) are shown in Table 5. As can be understood from the table, the conversion to ammonium thiocyanate reaches the peak at a certain time, and thereafter shows a tendency of slow decrease. (Ammonium thiocyanate was determined by titration of $N/_{20}AgNO_3$ solution.)

We claim:

1. A process for the simultaneous preparation of carbonyl sulfide and ammonium thiocyanate, which comprises heating and reacting urea with carbon disulfide at liquid phase, in aliphatic monohydric alcohol of one to four carbon atoms serving as the reaction medium.

2. The process of claim 1, wherein the reaction temperature ranges from 100° to 190° C.

3. The process of claim 1, wherein the reaction temperature ranges from 120° to 160° C.

4. The process of claim 1, wherein the reaction time ranges from 10 minutes to 5 hours.

5. The process of claim 1, wherein the quantity of reaction medium is at least sufficient to maintain the reaction mixture at homogeneous phase at the reaction temperature.

6. The process of claim 1, wherein the reaction medium is methanol.

* * * * *